United States Patent
Wang

(10) Patent No.: US 11,496,527 B2
(45) Date of Patent: Nov. 8, 2022

(54) DISTRIBUTED SESSION FUNCTION ARCHITECTURE SYSTEM AND METHODS

(71) Applicant: Netsapiens, Inc., La Jolla, CA (US)

(72) Inventor: David Tzat Kin Wang, Solana Beach, CA (US)

(*) Notice: Subject to any disclaimer, the term of this patent is extended or adjusted under 35 U.S.C. 154(b) by 0 days.

(21) Appl. No.: 17/009,436

(22) Filed: Sep. 1, 2020

(65) Prior Publication Data
US 2020/0404028 A1 Dec. 24, 2020

Related U.S. Application Data

(63) Continuation-in-part of application No. 15/138,425, filed on Apr. 26, 2016, now Pat. No. 10,764,361.

(60) Provisional application No. 62/271,984, filed on Dec. 28, 2015.

(51) Int. Cl.
| | |
|---|---|
| *H04L 65/1069* | (2022.01) |
| *H04M 7/00* | (2006.01) |
| *H04L 67/10* | (2022.01) |
| *H04L 67/141* | (2022.01) |
| *H04L 65/403* | (2022.01) |
| *H04L 65/1096* | (2022.01) |
| *H04N 7/15* | (2006.01) |
| *H04N 21/647* | (2011.01) |
| *H04N 7/14* | (2006.01) |
| *H04L 9/40* | (2022.01) |
| *H04L 65/1104* | (2022.01) |

(52) U.S. Cl.
CPC ...... *H04L 65/1069* (2013.01); *H04L 63/1416* (2013.01); *H04L 65/1096* (2013.01); *H04L 65/1104* (2022.05); *H04L 65/403* (2013.01); *H04L 67/10* (2013.01); *H04L 67/141* (2013.01); *H04M 7/006* (2013.01); *H04N 7/147* (2013.01); *H04N 7/152* (2013.01); *H04N 21/647* (2013.01)

(58) Field of Classification Search
CPC . H04L 65/1069; H04L 65/1006; H04L 67/10; H04L 63/1416; H04L 67/141; H04L 65/1096; H04L 65/403; H04L 65/608; H04L 65/80; H04L 67/02; H04L 67/18; H04L 65/1104; H04M 7/006; H04M 3/562; H04N 7/147; H04N 7/152; H04N 21/647
See application file for complete search history.

(56) References Cited

U.S. PATENT DOCUMENTS

| | | | |
|---|---|---|---|
| 7,441,429 B1* | 10/2008 | Nucci | H04L 63/1416 370/230 |
| 8,433,050 B1* | 4/2013 | Baten | H04M 3/568 379/202.01 |
| 8,850,263 B1 | 9/2014 | Yourtee et al. | |
| 2005/0188101 A1 | 8/2005 | Ludwig et al. | |
| 2012/0173742 A1 | 7/2012 | Noldus et al. | |
| 2013/0212242 A1 | 8/2013 | Mendiratta et al. | |
| 2014/0218465 A1* | 8/2014 | Bright-Thomas | H04N 7/152 348/14.09 |
| 2015/0002614 A1* | 1/2015 | Zino | H04N 21/4788 348/14.08 |
| 2015/0350075 A1 | 12/2015 | Li et al. | |

(Continued)

*Primary Examiner* — Gil H. Lee
*Assistant Examiner* — Chhian (Amy) Ling
(74) *Attorney, Agent, or Firm* — Merle W. Richman, Esq.

(57) ABSTRACT

A system, topology, and methods to enable certain session functions to be conducted over many session devices or over a large geographical area via geographically distributed servers. Other embodiments may be described and claimed.

20 Claims, 5 Drawing Sheets

(56) References Cited

U.S. PATENT DOCUMENTS

| | | | |
|---|---|---|---|
| 2016/0072766 A1* | 3/2016 | Jain | H04L 67/141 |
| | | | 709/228 |
| 2017/0041352 A1* | 2/2017 | Martens | H04L 65/403 |
| 2017/0222882 A1 | 8/2017 | Agrawal et al. | |
| 2017/0264648 A1* | 9/2017 | Hearty | H04L 63/00 |

* cited by examiner

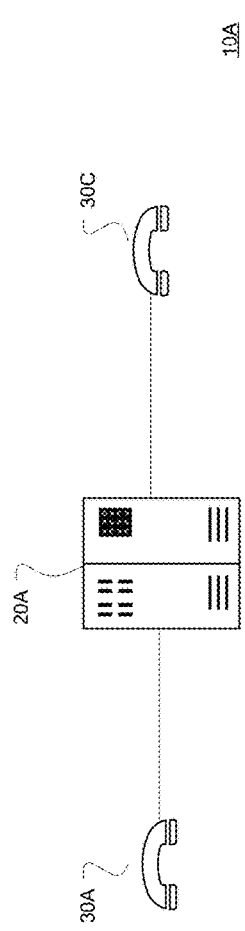
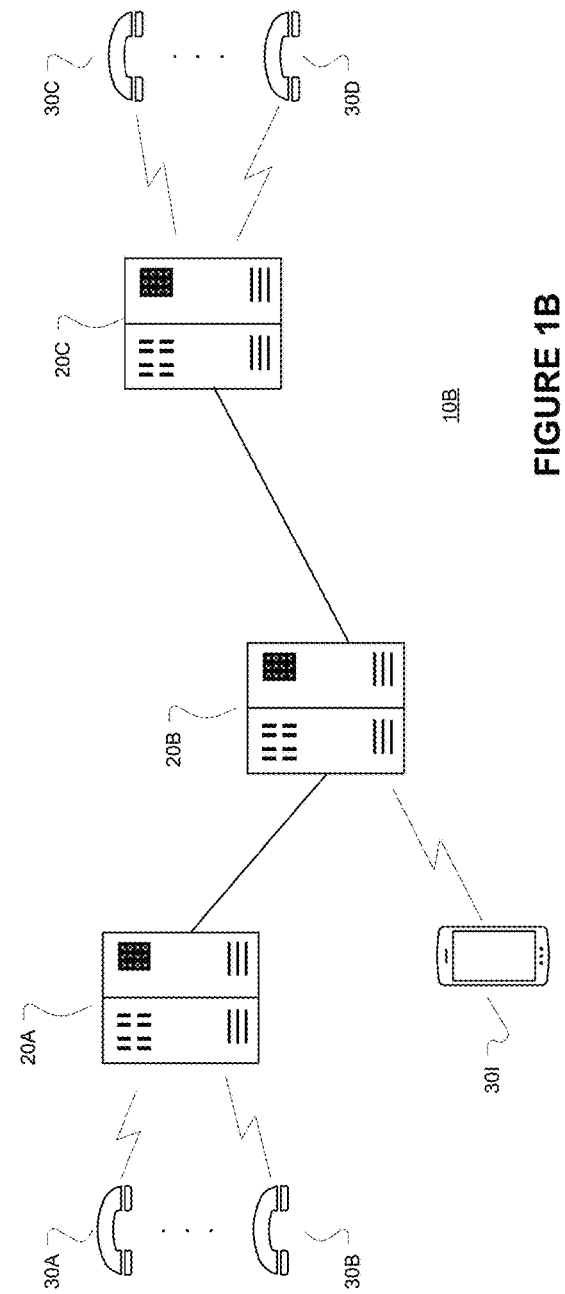
FIGURE 1A
FIGURE 1B

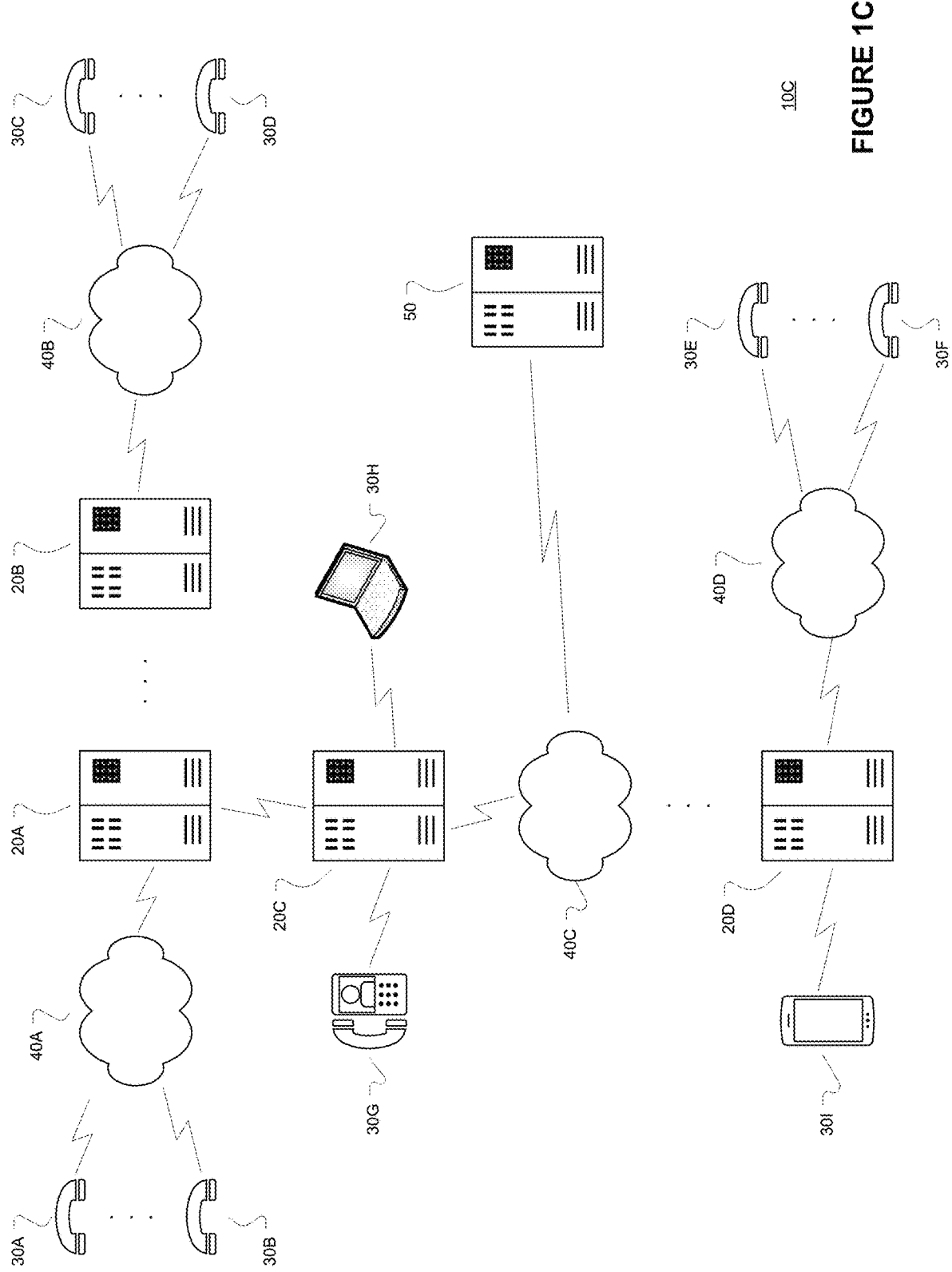

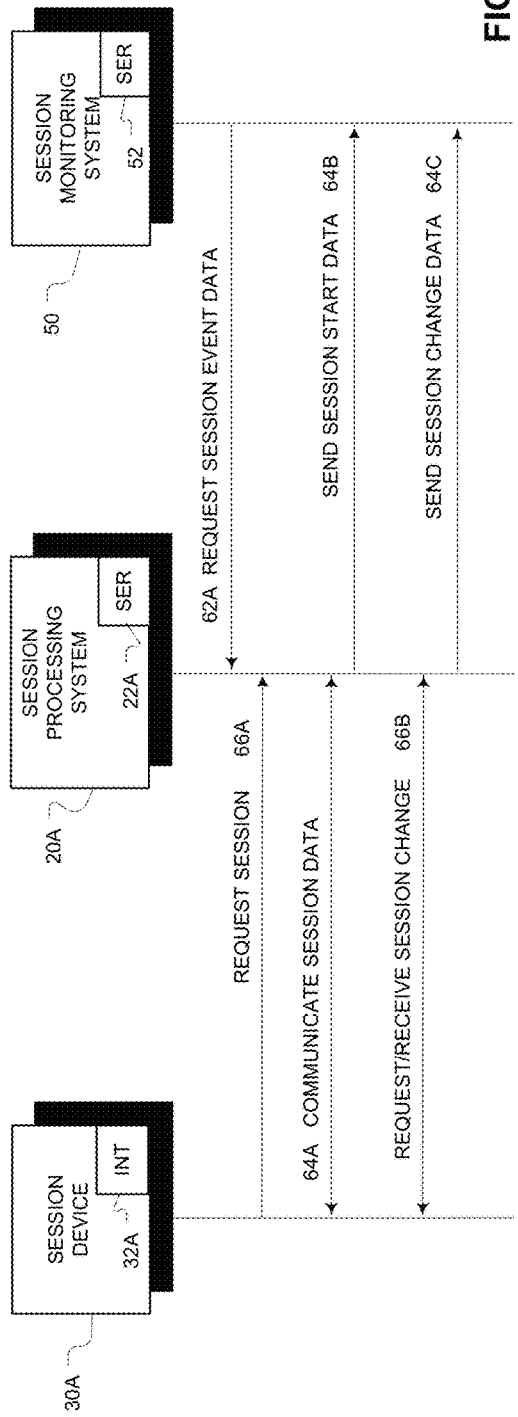
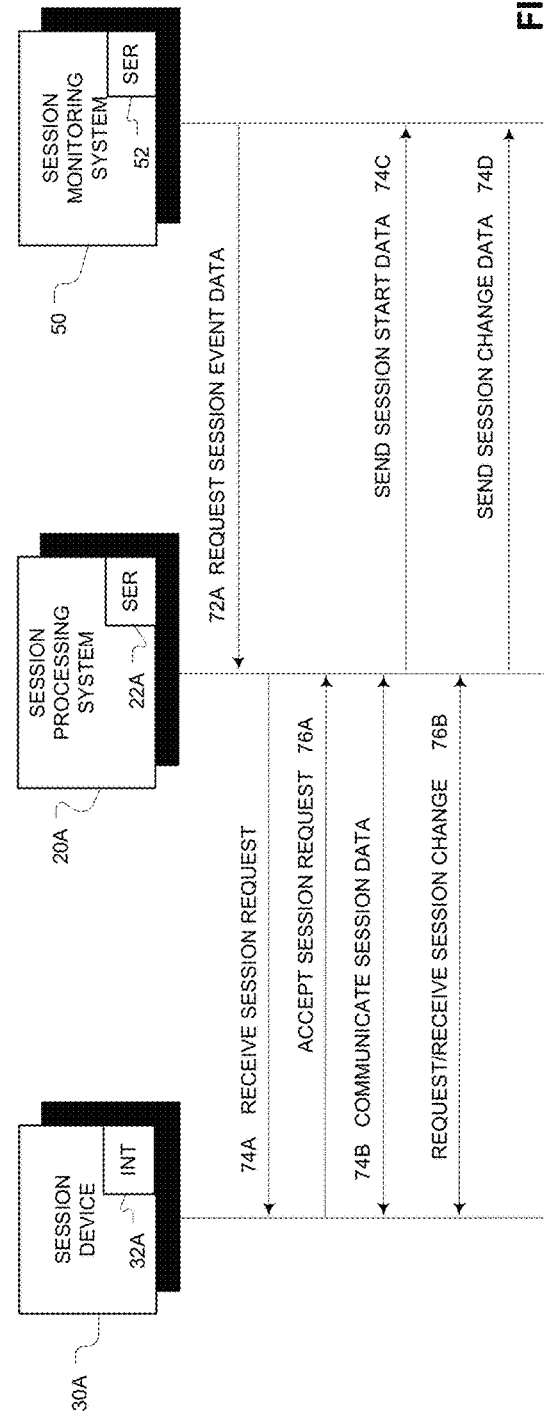

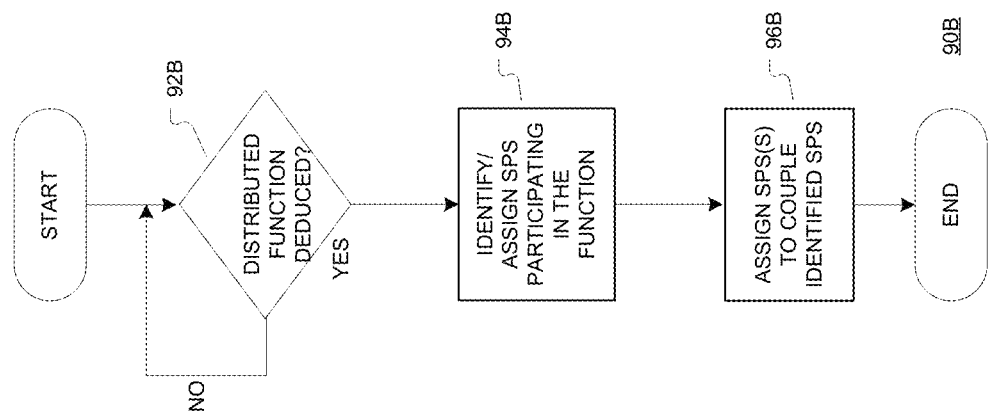
FIGURE 4B
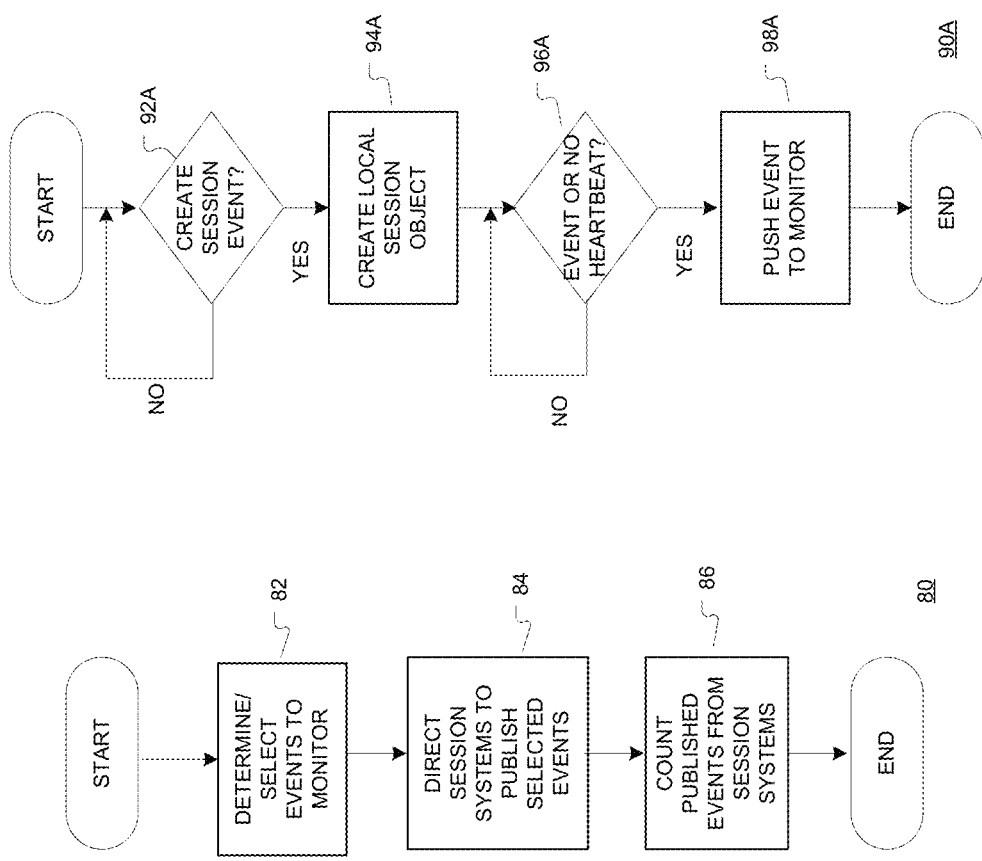
FIGURE 4A
FIGURE 3

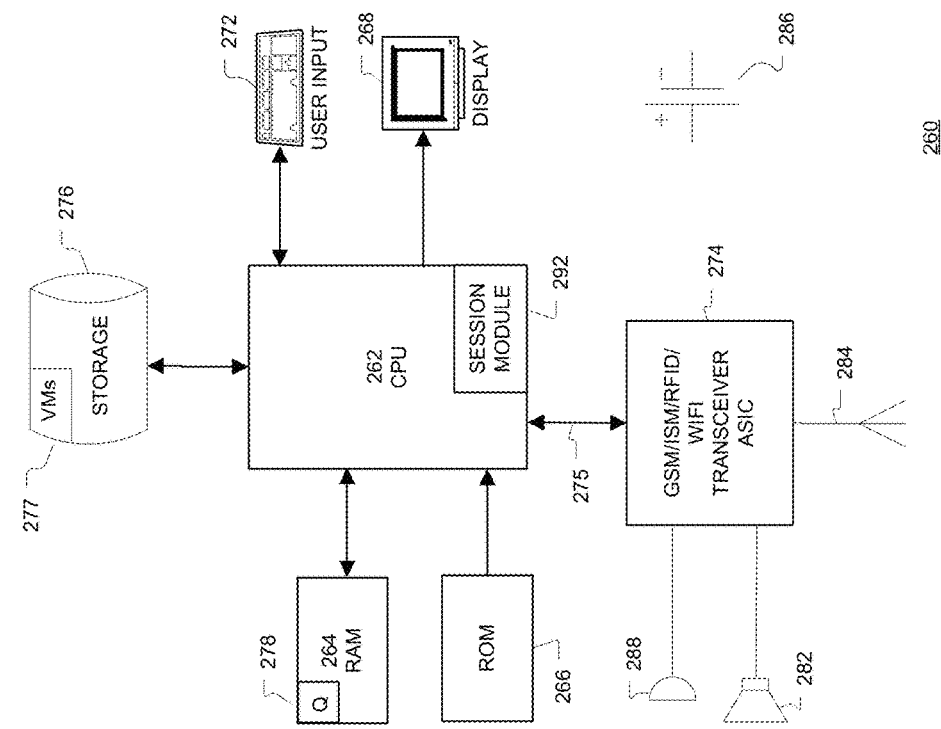
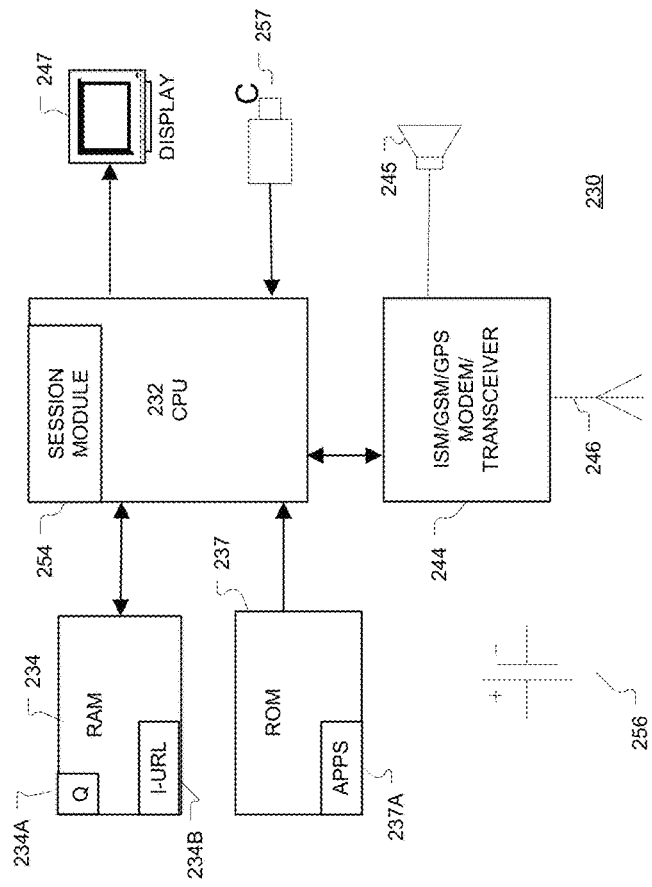
FIGURE 5B
FIGURE 5A

DISTRIBUTED SESSION FUNCTION ARCHITECTURE SYSTEM AND METHODS

TECHNICAL FIELD

Various embodiments described herein relate to addressing session functions that may be desirably enabled over a large geographical area.

BACKGROUND INFORMATION

It may be desirable to enable certain session functions to be conducted over many session devices or over a large geographical area. The present invention provides systems and methods for same.

BRIEF DESCRIPTION OF THE DRAWINGS

FIG. 1A is a simplified diagram of a session server architecture according to various embodiments.

FIG. 1B is a simplified diagram of a distributed session server architecture according to various embodiments.

FIG. 1C is a simplified diagram of another distributed session server architecture according to various embodiments.

FIG. 2A is a diagram of communication between a session device, a session processing system, and a session monitoring system in a distributed session server architecture according to various embodiments.

FIG. 2B is another diagram of communication between a session device, a session processing system, and a session monitoring system in a distributed session server architecture according to various embodiments.

FIG. 3 is a flow diagram illustrating several methods according to various embodiments.

FIGS. 4A-4B are flow diagrams illustrating several methods according to various embodiments.

FIG. 5A is a block diagram of an article according to various embodiments.

FIG. 5B is a block diagram of another article according to various embodiments.

DETAILED DESCRIPTION

An electronic session provider including a software session provider, voice over internet protocol (VOIP) provider, or application service provider (ASP) may provide sessions to or enable sessions between user devices (session capable devices 30A-30I—FIG. 1C). The sessions may be real time sessions including real time media sessions. The media may include multimedia, where the multimedia may include images, video, or sound. The session capable devices may be located at various locations and coupled to various electronic session providers based on proximity to the session capable devices. In addition, depending on density of session capable devices in certain geographical regions, an electronic session provider may host a large number of sessions for geographically local session capable devices.

In an embodiment, a session provider may employ a communication architecture including a session server/system architecture 10A-C as shown in FIG. 1A-1C that includes one or more session processing systems or servers 20A-20D. The session processing systems 20A-20D may provide requested sessions or communicate session data between systems 20A-20D. In order to support user session devices 30A-I that are large in number or geographically separated, an architecture 10C may include multiple session processing systems or servers 20A-20D and form part of a distributed communication architecture. The session processing systems or servers 20A-20D may also be geographically separated based on user session device 30A-I deployments or density. A user session device 30A-I may be any session capable device. The session processing systems ("SPS") 20A-D may be employed to enable certain session functions to be conducted over many session devices or over a large geographical area where different SPS 20A-D may be employed to provide different attributes or segments of the desired session function(s).

In addition in such embodiments, it may be desirable to monitor, track, count, or compile sessions and session functions conducted, requested, or joined by a user session device 30A-I via session processing systems 20A-20D. Monitoring sessions, session functions, and activities of various SPS 20A-D may enable, confirm, or determine presence status of user session device(s) 30A-I such as during various communication activities. Monitoring sessions, session functions, and activities of various SPS 20A-D may also enable license control of users associated with session devices 30A-I including the number of active sessions. Monitoring sessions, session functions, and activities of various SPS 20A-D may enable or determine capacity limit and load balancing of session processing systems 20A-D employed in an architecture 10C where sessions and functions may be distributed to various systems 20A-D as a function of capacity limits and desired load balancing.

For example, certain functions may be distributed across many SPS 20A-D to enable larger capacity and prevent a single or more limited number of SPS 20A-D from failing due to session or functionality (memory, processor, bandwidth) limits. Otherwise, when a session device 30A-I requests a session function that involves a large number of session devices 30A-I, a single or limited number of SPS 20A-D may be unable to perform the session function (due to memory, processor, bandwidth limits), e.g., a conferenced multimedia session where all sessions must be summed and propagated to all participating session devices 30A-I may overwhelm one or more SPS 20A-D.

Monitoring sessions, session functions, and activities of various SPS 20A-D may also enable or determine automatic call or function distribution via session processing systems 20A-D employed in architecture 10A-10C where sessions or functions may represent multimedia calls including VOIP calls, video calls, or others (such as virtual reality). Monitoring sessions, session functions, and activities of various SPS 20A-D may also enable or determine fraud detection present in sessions provided by session processing systems 20A-D employed in architecture 10A-10C.

In a basic session server architecture shown in FIG. 1A, a user may have a single user session device 30A coupled to a single node or session processing system 20A. Another user may also have a single user session device 30C coupled to the same node or session processing system 20A. In such an embodiment, session events created or hosted by the session processing system 20A may be determined by monitoring only transactions conducted by the session processing system 20A. In an embodiment, the session processing system 20A may be process VOIP communications and function as a Back to Back User Agent (B2B UA). In such an embodiment, a session function may be handled or enabled by the SPS 20A given the limited number of session devices 30A-I. However, as the number of session devices 30A-I coupled to the SPS 20A increases, session functions may be limited due to the SPS 20A memory, processor, or bandwidth.

FIG. 1B is a simplified diagram of a distributed session server architecture 10B according to various embodiments. As shown in FIG. 1B, architecture 10B may include a 1$^{st}$ plurality of user session devices 30A-30B, a 2$^{nd}$ plurality of user session devices 30C-30D, a user session device 30I, and session processing systems 20A, 20B, and 20C. Session devices 30A-B may communicate with the session processing system 20A and user session devices 30C-D may communicate with the session processing system 20C. The session processing system 20B may bridge communication between session processing systems 20A and 20C in an embodiment. In order to achieve desired session monitoring, it may be desirable to count or monitor communications between the user session devices 30A-B and 30C-D but not between the session processing system 20B and the session processing systems 20A and 20C. It is noted that other user session devices 30I may also communicate with the session processing systems 20B.

In the embodiment shown in FIG. 1B, more complex (processor, memory, or bandwidth intensive) session functions may be handled or enabled by the architecture 10B by sharing loads requirements for a particular SPS 20A-C across multiple SPS 20A-C. For example, a large multimedia conference session originated at SPS 20A but including many devices 30A-I or devices 30A-I on other SPS 20B-C may be distributed and summed at multiple SPS 20A-C, thereby increasing the number of session devices 30A-I that may be able to participate in a particular multimedia conference (more complex session function) in an embodiment.

FIG. 1C is a simplified diagram of another distributed session server architecture 10C according to various embodiments. As shown in FIG. 1C, architecture 10C may include a plurality of user session devices 30A-30B, 30C-30D, and 30E-30F, and user session devices 30G-30I, cloud interfaces 40A-40D, session processing systems 20A-20D, and a session monitoring system 50. The plurality of session devices 30A-B may communicate with the session processing system 20A via a first cloud interface 40A. The plurality of user session devices 30C-D may communicate with the session processing system 20B via a second cloud interface 40B. The session processing system 20A may be coupled directed or indirectly with session processing system 20B via other session processing systems or cloud interfaces. Clouds or cloud interfaces 40A-D may represent local networks or a network of networks termed the "Internet" in an embodiment.

User session devices 30G and 30H may communicate with another session processing system 20C. The session processing system 20C by coupled directly or indirectly to other session processing systems 20A and 20D. User session device 30I may communicate with a session processing system 20D. The plurality of user session devices 30E-F may communicate with the session processing system 20D via cloud interface 40D. The session processing system 20D may be coupled directly or indirectly to another session processing systems 20C. The user session devices 30A-30I may be any device capable of communicating with a session processing system 20A-20D via session communication protocols/channels. For example, a user session device 30A-30I may support VOIP communication protocols and communicate with a session processing system 20A-20D via wired or wireless protocols/channels. A user session device 30A-30I may include a VOIP enabled device, VOIP modem, cellular device, personal data device, laptop, desktop, tablet, or other device including a modulator/demodulator (modem), network interface, or processor capable of communicating and supporting a session protocol/channels as provided, hosted, or communicated by one or more session processing system(s) 20A-20D.

In the embodiment shown in FIG. 1C, even more complex (processor, memory, or bandwidth intensive) session functions may be handled or enabled by the architecture 10C by sharing loads requirements for one or more SPS 20A-D across multiple SPS 20A-D and the session monitoring system 50. For example, a large multimedia conference session originated at SPS 20A but including devices 30A-I on other SPS 20B-D may be distributed and summed at multiple SPS 20A-D and the session monitoring system 50, thereby further increasing the number of session devices 30A-I that may be able to participate in a particular multimedia conference (more complex session function) in an embodiment.

Similar to architecture 10B, it may be desirable to count or monitor communications between the user session devices 30A-I and session processing systems 20A-D but not communications between the session processing systems 20A-D. In an embodiment, session processing systems 20A-D may track, compile, report, or otherwise monitor sessions between a user session device 30A-I and a or their session processing system 20A-D. The session processing systems 20A-D may also track, compile, report, or otherwise monitor sessions between session processing system 20A-D that are invoked by a user session device 30A-I, for example, to perform a session function that is distributed among several SPS 20A-D. In a further embodiment, the session processing systems 20A-D may only track, compile, report, or otherwise monitor sessions between user session devices 30A-I and their session processing system 20A-D.

In an embodiment, an architecture 10C may include one or more session monitoring systems 50 to track, compile, report, or otherwise monitor sessions between user session devices 30A-I and a session processing system 20A-D. Session monitoring systems 50 may also detect when a session function that requires or includes multiple SPS 20A-D is being invoked and direct the operation of SPS 20-D to handle the invoked session function. The session monitoring system 50 may also track, compile, report, or otherwise monitor sessions between session processing system 20A-D that are invoked by a user session device 30A-I. In a further embodiment, the session monitoring system 50 may only track, compile, report, or otherwise monitor sessions between user session devices 30A-I and a session processing system 20A-D.

In an embodiment, a session monitoring system 50 may be coupled directly or indirectly to one or more session processing systems 20A-D and receive session information directly or indirectly from one or more session processing systems 20A-D via other channels. The channels may be specialized, monitoring channels that a session monitoring system 50 may monitor and use to communicate with and orchestrate session functions with SPS 20A-B in an embodiment. A session processing system 20A-20D may forward session information from other session processing systems 20A-D to a session monitoring system 50. In a further embodiment, one or more session processing systems 20A-D may work in tandem with one or more session monitoring systems 50 to monitor sessions conducted in any manner by one or more user session devices 30A-I including performing a session function across multiple SPS 20A-D, such as session conferencing, session transfers, and session pickup (call conference, call transfer, and call pickup generally).

As shown in FIGS. 1A-C, an architecture 10A-C may include multiple user session devices 30A-I. A user or client may own multiple user session devices 30A-I and may conduct multiple sessions simultaneously, such as in a call center. A single user may also conduct multiple sessions in an architecture including multiple VOIP sessions (one live conference call via multiple user session devices 30A-I and other activities with other user session devices 30A-I providing voicemail). In some session types, determining the number of and orchestrating active sessions may be complex. For example, a VOIP or multimedia session may include multiple callers or callees such as a conference bridge that accept calls and initiates outbound calls. Further, the callers or callees present/active in a VOIP or multimedia session may change including due to blind transfers. As a function of the active user session devices 30A-I, the session processing system(s) 20A-D handling one or more communication streams for a VOIP or multimedia session may also change during a VOIP or multimedia session. As noted, the session processing systems 20A-D may be geographically separated to support and balance user session devices 30A-I present at various geographical locations or to handle certain session functions.

As noted, it may be desirable to track or orchestrate sessions including VOIP or multimedia sessions including to provide presence logic as required for VOIP or multimedia protocols. VOIP, multimedia, or other sessions may be tracked to ensure license terms or capacity constraints based on such licenses are enforced. In addition, VOIP or other sessions may be tracked to balance or distribute sessions across session processing systems 20A-D in architecture 10C to optimize session processing and access for user session devices 30A-I including complex session functions. Further, VOIP or other sessions may be tracked to enable call features including forward on busy, call accounting, fraud detection, statistics and telemetry, and limit call distributions based on user session devices 30A-I where a user session device or devices may be employed in call centers.

In an embodiment, any of the session processing systems 20A-D may process VOIP or multimedia sessions by functioning as a Session Initiation Protocol (SIP) agent including a SIP Back-to-Back User Agent (B2BUA) where each B2BUA may maintain two (2) SIP Transactions, each towards an individual endpoint (between two user session devices 30A-30I). As noted and shown in architecture 10A, FIG. 1A, a session processing system 20A may function as a single node where there is one user agent (UA) toward the Caller (via the user session device 30A) and one UA toward the Callee (via the session device 30C) in a VOIP session according to SIP. As shown in architectures 10B and 10C, FIG. 1B and FIG. 1C, a VOIP session may involve multiple nodes (or session processing systems 20A-D). In such an embodiment, a session device 30A-I functioning as a Caller and Callee may communicate with several nodes (session processing systems 20A-D) including a difference node between endpoint nodes where one UA at each node has a direct SIP transaction with one physical endpoint.

During various states, a session processing system 20A-D may function as a transit only node where both UAs (user agent client and user agent server) include a SIP transaction to a node not directly to either the Caller or Callee (session device 30A-I). In order to monitor desired sessions or session events, an embodiment may employ the algorithm 80 shown in FIG. 3. As shown in FIG. 3, in an embodiment one or more events may be determined or selected to be monitored (activity 82), where events to be monitored may be limited and predetermined based on the requirements of underlying architecture. In an embodiment, events to be monitored may include session functions that may processed by multiple SPS 20A-D including where a SPS 20A-D may perform a function other than merely passing a signal between SPS 20A-D.

The algorithm 80 may request or direct session processing systems 20A-D to publish certain limited, predetermined or selected session or session events to one or more session monitoring systems 50 or other particular session processing systems 20A-20D (activity 84) including related to complex session functions including multimedia conference calls. The published events may also be used to control the operation of SPS 20A-D for such complex session functions in addition to counting certain activities for licensing purposes in an embodiment. The algorithm 80 may employ session counting logic to determine or deduce relevant session or session events of interest based on the desired monitoring activity or actions (activity 86) via one or more session monitoring systems 50 or other particular session processing systems 20A-20D.

In a VOIP, SIP protocol supported architecture, such an analysis may include requesting or directing session processing systems 20A-D to publish particular session or session events that signal the Creation, Update or Delete of a Session and its associated Objects, such as associated User and Role, such as Caller and Callee. In an embodiment during a VOIP session using SIP, the session or session events may be published via specialized monitoring channels of a Service Bus (SBUS) to a session monitoring system 50 or particular session processing system 20A-20D according to various embodiments.

In an embodiment employing SIP protocol(s) only the session processing systems 20A-D that generate endpoint session events may be directed to communicate activity via a SBUS to a session monitoring system 50. In an embodiment a session monitoring system 50 may also be a session processing system 20A-D. In such an embodiment employing SIP protocol(s) session processing systems 20A-D acting as transit nodes may not be directed to communicate activity via a SBUS to a session monitoring system 50. In events employing SIP protocol(s), desired session events may be associated with UA(s) that maintains direct SIP transaction with endpoints (session processing system(s) 20A-D including acting as a user agent client (UAC) or user agent server (UAS)). A UAC may send SIP requests and a UAS may receive the requests and return a SIP protocol response.

In an embodiment, a UA (UAC or UAS) that maintains a direct SIP transaction with an endpoint (session processing system 20A-D) maybe unique per call or session. In an embodiment, there is only one such unique transaction for the Caller, one for the Callee, and no unique transactions are created in any transit UAs or nodes. In an embodiment, a VOIP event may include "create", "update", and "delete" event. In an embodiment, a create event may be generated when a call is initially associated with a specific user (user session device 30A-I). An update event may be generated when some information associated with the call relevant to a specific user via a session device 30A-I has changed and periodically as a "heartbeat". A delete event may be generated when a call stop is associated with a specific user (or user session device 30A-I).

In an embodiment, each node of a session event (session processing system 20A-D) has a Hostname and a Session ID unique to the generating node (session processing system 20A-D) associated with the call. While the node's Session ID is not globally unique, the combination of the nodes call Session ID and nodes Hostname may be globally unique. The combination of session ID and Hostname may be communicated along with session events to a session monitoring system 50. Other session data may include the user's Role including Caller, Callee, By, Owner of the Caller Device, and Owner of the Callee Device. In an embodiment, the "By" role may represent a 3rd Party User that initiated the Call, including a User that created a call by a Transfer and now substituted by the current Callee. The Owner of the Caller Device may be provided when the Caller is not the Owner of the Device (session device 30A-I). The Owner of the Callee Device may be provided when the Callee is not the Owner of the Device. For example, the Owner of the Callee may be provided in an embodiment when a call is dispatched from a Call Center Queue or when the User that owns/controls a Call Queue is not the owner of the device used by the Call Center Agent.

Session event data may also include an Origination Call ID, a Termination Call ID, an Origination URL, and a Termination URL. In an embodiment the Origination Call ID may be the SIP's Call identifier (ID) in an incoming INVITE that originated a call. The Termination Call ID may be the SIP's CALL ID in an outgoing INVITE towards a Callee. The Origination URL may be the SIP's From-URL in an incoming INVITE that originated a call. The Termination URL may be the SIP's To-URI in an outgoing INVITE towards a Callee. In an embodiment, session event data may also include activity of a SPS 20A-D related to participating in the processing of session function.

FIG. 2A is a diagram of communication 60 between a session device 30A, a session processing system 20A, and a session monitoring system 50 in a distributed session server architecture 10C according to various embodiments. FIG. 2B is another diagram of communication 70 between a session device 30A, a session processing system 20A, and a session monitoring system 50 in a distributed session server architecture 10C according to various embodiments. As shown in FIG. 2A and FIG. 2B, a session monitoring system 50 including a server 52 may request a session processing system 20A including a server 22A to provide certain session event data 62A, 72A. The session processing system 20A may create a local session object upon receipt.

In communications 60, a User via a session device 30A including an interface 32A may request a session including a VOIP or multimedia session 66A. A session processing system 20A may communicate session data 64A as requested and forward/publish session events to the session monitoring system 50 including a send session start data 64B via a SBUS channel in an embodiment. When the user requested session 66A invokes certain session functions, the SPS 20A may forward the request 66A to a central or controller system 20A-D, 50 directly or via the SBUS channel. The central or controller system 20A-D, 50 may then control the operation of one or more SPS 20A-D via the SBUS channel or other path to direct or orchestrate the operation of the SPS 20A-D to be handle or enable the requested session function.

Upon a User request to change a session 66B, a session processing system 20A may send session change data 64C to a session monitoring system 50 via a SBUS channel in an embodiment. In communications 70, a user session device 30A may receive a session request communication 74A. Once a User via a session device 30A accepts (may be automatic process) a session request 76A, the session processing system 20A may send a session update message including a session start data communication 74C to a session monitoring system 50 via a SBUS channel in an embodiment. Similar to communication 60, upon a User request to change a session 76B, a session processing system 20A may send a session change data communication 74D to a session monitoring system 50.

In an embodiment, session processing systems 20A-D may be directed to publish selected events to a session monitoring system 50 via one or more channel(s) of a service bus (SBUS). In order to enable a session processing system 20A-D, a SBUS Proxy may be implemented in each session processing system 20A-D to enable the system to generate/publish events to the SBUS. In an embodiment, an SBUS Proxy at each session processing system 20A-D may be made aware of any peer nodes by a "Cluster Manifest" which may declare any Peer Nodes by the URL to the SBUS Proxy at each peer node (other session processing system 20A-D in an architecture 10A-C). Further, the URL of each SBUS Proxy may be defined with a Fully Qualified Domain Name (F QDN) corresponding to a validated SSL Certificate for security. In addition, SBUS Proxies may communicate with each other via Hypertext Transfer Protocol over a Secure Sockets Layer (HTTPS) for both privacy and authentication by associated SSL Certificates.

In an embodiment SBUS channels may provide granularity of SBUS Events into subsets where each subset may be sent through its own SBUS Channel. It is noted that each Service or Application that desires to receive SBUS Events must declare their URL with their local SBUS Proxy, acting as a trusted entity to permit such declaration. A physical declaration file may be written in a directory owned by a local SBUS Proxy to form declarations and then be qualified to have physical control of SBUS Proxy's file system. In an embodiment, each declaration may specify only one SBUS Channel per Service. The URL of each SBUS Service may be defined via a FQDN corresponding to a validated SSL Certificate. SBUS Events may be delivered to the URLs for the declared Services over HTTPS. Session processing systems 20A-D may distribute events to all declared Service within the SBUS Channel. In an embodiment, a session processing system 20A-D may declare each service to be delivered as either persistent or non-persistent, where persistent delivery retries until positive acknowledgement is received while non-persistent does not require acknowledgement.

In another embodiment, a session processing system 20A-D may employ a send method to communicate events to a session monitoring system 50. In such a method, a session processing system 20A-D may send selected events to the first available Service within an SBUS Channel designated for the event. A SBUS Proxy may retry all declared Services within Channels, in a randomized order, until either a positive acknowledgement, or the all declared Service had been tried.

In order to monitor events using the SBUS protocol, a session monitoring system 50 may receive Session Events by making a declaration of its listener's URL in the "Session Events" SBUS Channel. In an embodiment, a session monitoring system 50 may employ the "non-persistent" push service. Once session processing system 20A-D (node) receives a create session event from a UA (other node, session device 30A-301), it may employ the algorithm 90A shown in FIG. 4A. As shown in FIG. 4A, once a create session event request (activity 92A) is received by a session processing system 20A-D (node), a session processing system 20A-D or session monitoring system 50 may create a local session object to monitor desired events (activity 94A). The Session Object may be uniquely identified by a Session ID+Hostname conveyed in the Session Create Event request. All subsequent Session Update or Delete Events associated with this Session Object will have this same pair of Session ID+Hostname in an embodiment.

In an embodiment, when a system 20A-D determines an event or heartbeat period expiration has occurred (no heartbeat signal received) (activity 96A) (such as an event to/from a session device 30A-I), the system 20A-D may publish the activity to a session monitoring system 50 (activity 98A). In another embodiment, the session monitoring system 50 may determine when an event or heartbeat period expiration has occurred (no heartbeat signal received) (activity 96A) (such as an event to/from a session device 30A-I). In an embodiment, each local Session Object has a Heartbeat Timeout, which will be started as soon as the local Session Object is created. In an embodiment, the processing system 20A-D (node) acting as a UA that generates the Session Create Event is responsible to send a Session Update Event upon any changes to the Session's information, or upon every Refresh Period (default to 100 s in an embodiment but configurable to other periods).

In an embodiment, the heartbeat timeout for a local session object may be set to a multiple of the refresh period, 3 times the refresh period in one embodiment. If the heartbeat timeout occurs, the session object may be destroyed and will not report session updates. In such an embodiment, a 3-period timeout may allow 3 session events to be reported prior to destroying the local session object. Further in an embodiment each session event or update may reset the Heartbeat timeout for a session object.

A session monitoring system 50 may receive/monitor/listen for published or pushed session events and count the events based on device, user, domain, Host, or other session event datum and User selections. Counting by Device (session device 30A-I) may be determined by the origination URL or termination URL contained in published session events. In an embodiment, a pointer to the Session may be inserted into a corresponding Origination or Termination Session Map associated with the identified Device respectively. When an associated Session ends, either explicitly by the Session Delete Events or a Heartbeat Timeout, corresponding Origination or Termination Session map entries may be erased. Instantaneous Session (or Call for VOIP sessions) Counts for a device may be determined by the size of the resultant Origination and Termination Session Maps.

Counting by User may be determined by the "User ID" contained in the Session Events, which may identify the User associated with the published Session. Similar to counting Devices, a pointer to the Session may be inserted into a Session Map associated with an identified User. When an associated Session ends, either explicitly by a Session Delete Events or Heartbeat Timeout, corresponding map entries may be removed. Instantaneous Session (or Call for VOIP sessions) Counts for a User may be determined by the size of the resultant User Session Map.

Counting by Domain may be determined by parsing the Domain from the User ID where User ID contained in the Session Events includes <User>@<Domain> where the <Domain> component identifies the Domain associated with the Session. A pointer to the Session may be inserted into a Session Map associated with the identified Domain. When an associated Session ends, either explicitly by a Session Delete Events or Heartbeat Timeout, corresponding map entries may be removed. Instantaneous Session (or Call for VOIP sessions) Counts for a Domain may be determined by the size of the resultant by the size of the Domain Session Map.

Counting by Host may be determined by the "Hostname" contained in the Session Events, which may identify the User associated with the published Session. Similar to counting Devices, a pointer to the Session may be inserted into a Session Map associated with an identified User. When an associated Session ends, either explicitly by a Session Delete Events or Heartbeat Timeout, corresponding map entries may be removed. Instantaneous Session (or Call for VOIP sessions) Counts for a User may be determined by the size of the resultant User Session Map.

As noted, certain session functions that a User via a session device 30A may request may require multiple SPS 20A-D and SMS 50 in order to be processed, termed a distributed function such as session conferencing, session transfers, and session pickup (call conference, call transfer, and call pickup generally). When such a session request 66A is detected or deduced (activity 92B of algorithm 90B shown in FIG. 4B) in an embodiment, one or more SPS 20A-D and SMS 50 may be identified or assigned to participate in the requested session function (activity 94B of algorithm 90B shown in FIG. 4B.). In an embodiment, a SPS 20A-D and SMS 50 may be identified based on a session device 30A that is part of the session function that is coupled to the SPS 20A-D and SMS 50. A SPS 20A-D and SMS 50 may be assigned to participate or enable a session function based on its geographical or logical connection between the identified SPS 20A-D and SMS 50 in an embodiment (activity 96B of algorithm 90B shown in FIG. 4B.) For example, for a session function including a multimedia conference, one or more SPS 20A-D and SMS 50 may be identified to operate to sum multimedia sessions from session devices 30A-I. When the one or more SPS 20A-D and SMS 50 or geographically distributed, the one or more SPS 20A-D and SMS 50 may form "geographically distributed summing function (GDSF) that are active GDSF (AGDSF) when they are currently processing active multimedia conference sessions.

One or more SPS 20A-D and SMS 50 may be assigned or configured to act as intermediary or bridge so a global aggregate sum (GAS) signal representing is the combination of the processing from all SPS 20A-D acting as an AGDSF may be formed. Thereby each AGDSF may receive a summed multimedia conference signal and forward the resultant complete multimedia conference signal to each participating session devices 30A-I (after subtracting the specific Participants audio from this aggregate sum). As noted, when a SPS 20A receives a session function request from a session device 30A-I (communication 66A), it may determine whether all the participants of the session function will be handled by itself or whether it has the ability (memory, bandwidth, processor) to independently handle the requested session function.

For a session function representing a multimedia conference, the SPS 20A (an AGDSF) may determine that the conference will be split (split conference (SC)) when participants (session devices) are operatively coupled to other SPS 20A-D (other AGDSF), in particular when there are more than one AGDFS other than itself that must be active in order to perform the conference. Initially, session events may be used to signal the Creation, Update or Deletion of a Session associated with Conference Participant (Objects) coupled to a SPS 20A-D functioning as an AGDFS, the session events acting as telemetries for the Session Status of each Conference Participant coupled to SPS 20A-D.

In an embodiment, a SPS 20A-D or SMS 50 may use the Service Bus (SBUS) to Publish such Session Events to all subscribed and authorized Geo Distributed Peer Conference instances where the Session Status of each Conference Participant is propagated to all participating GDFS. In an embodiment, at each AGDSF (SPS 20A-D) an instance may be created that subscribes to the Session Events over the SBUS to deduce the relevant Count of Calls associated with the Conference Participant Objects—number of participants of conference call being summed by a SPS 20A-D.

In an embodiment, each Participant Session Event may identify a Conference Participant by its address of record ("AOR") and the Conference it belongs to by the Conference AOR. For each SPS 20A-D functioning as a AGDSF instance there is an associated "Hostname". In an embodiment, the Session State for a conference Participant is designated as "active" when the multimedia Stream from the Participant is being processing by Summing Function (SPS 20A-D functioning as a AGDSF). Other the conference participant may be designated to have a number of other non-Active states such as "inactive", "answering", "announcing", "disconnecting".

As noted in an embodiment, conference participant Session Events may be published over the SBUS via a specific channel, such as a "conference_events" channel. All SPS 20A-D (acting as an AGDSF) instances may listen for activity on such channel. When a conference Participant Session Events is received by an AGDSF, all Active Participants may be pushed into an Active Participant Map keyed by the conference Participant's AOR. The resultant Active Participant Map may be iterated (between AGDSF) periodically to construct a Split Conference Map keyed by the SPS 20A-D Hostname. In an embodiment, when the size of the resultant Split Conference Map is greater than one (meaning more than one SPS 20A-D acting as an AGDSF, a split conference (SC) scenario may be deduced where the map of Hostname provides the list of AGDSF.

As noted in an embodiment one or more SPS 20A-D or SMS 50 acting as an AGDSF may be assigned to function as an aggregator of the summations of other AGDSF. There be a single aggregator (AGDSF) that may function as a bridge between other AGDSF and be termed a Bridge-Hub. In an embodiment, SPS 20A-D or SMS 50 acting a AGDSF functioning as a bridge-hub may create a local participant to represent the addition of the GAS media. In particular, when the other SPS 20A-D acting as an AGDSF deduces or detects the SC scenario (participants not coupled to the AGDSF), it may create a Bridge Participant (BP) locally to represent this Peer AGDSF. The SIP Address of Record (AOR) for this BP will have the Hostname of the Peer AGDSF.

In an embodiment, the AGDSF (of all AGDSF in a SC) with the smallest lexicographical hostname may be nominated as the Bridge-Hub, and represented by a Bridge Hub Participant (BHP). All others AGDSF will become Bridge-Spoke and represented by a Bridge-Spoke Participant (BSP). In an embodiment, the AGDSF functioning as the Bridge-Hub may stay passive to accept SIP INVITE(s) from AGDSF(s) functioning as Bridge-Spokes to establish Bridge Session to establish a Split Conference Bridge (SCB).

All Bridge-Spoke ADSFs may send a SIP INVITE message towards the Bridge-Hub to initiate a Bridge Session. The To-URI in the INVITE may have the BHP's AOR so that it can be routed to the designated Peer AGDSF. The From-URI will have the AOR of the associated BSP as identification. In an embodiment, when an INVITE message is received at SPS 20A-D acting as the Bridge-Hub, the From-URI in the INVITE may result in a match in the table of authorized Peer AGDSF, and a BSP identified by the From-URI may be created at this Peer AGDSF.

In an embodiment once connected, the bridged AGDSFs may stream their own locally Summed multimedia towards each other. The multimedia Stream received from the BHP may be fed into the local Summing Function, which results in a local version of the GAS, which could then be streamed to all the local Active Participants as well as the BHP (forming the resultant spoke and wheel). This summing of the multimedia Stream from the BHP with the multimedia Stream for all other local Participants is the same operation performed at all bridged AGDSF in an embodiment. The Summing Function actually does not distinguish the BHP from normal Participants, but implicitly creates a GAS locally at each AGDSF (each spoke).

With such a Bridge-Hub nomination mechanism, two AGDSFs should not send an INVITE to establish Bridge Session towards each other. However, in case of an unlikely scenario of a Bridge Contention, in an embodiment a glare resolution may applied. In particular, a AGDSF receiving a SIP INVITE from a Peer AGDSF to establish a Bridge Session where there is already a Active local BP corresponding to this Peer may determine that a Bridge Glare exists. Upon detection of the existence of a Bridge Glare, an AGDSF may compare its own Hostname against it's Peer Hostname. Whichever is lexicographically less will be nominated as the Bridge-Hub, and the other as Bridge-Spoke. Accordingly, the INVITE from Bridge-Hub will be rejected, while the INVITE from Bridge-Spoke will be accepted. In effect, the Bridge-Hub will back off, while Bridge-Spoke will connect.

When multiple SPS 20A-D acting as GDSF(s) become Active about the same time, a fragmented view of the list of AGDSF, i.e. Multiple Bridge-Hub being nominated and forming multiple Bridge Islands may be created. Nevertheless, in an embodiment, the Participant Session Event concerning the BHP will be propagated eventually to other BSP. Then the Multiple Bridge-Hub scenario will be obvious from the logic for the Distributed Call Counting mechanism at every GDSF. In an embodiment, all inferior Bridge-Hub (s) as determined from its local Split Conference Map may determine/realize that there is a superior Bridge-Hub by the lexicographical order of their Hostname. In such an environment, all inferior Bridge-Hubs will abdicate by disconnecting all its Bridge Session(s) and re-incarnate itself as a Bridge-Spoke by sending a SIP INVITE towards the Superior Bridge-Hub (to establish a Bridge Session with it). Accordingly in an embodiment, all the SPS 20A-D acting as Bridge-Spoke(s) that previously have a Bridge Session with the inferior Bridge-Hub would lose their Bridge Session, re-select and establish a Bridge Session with the Superior Bridge-Hub.

As noted, when there are more than 2 SPS 20A-D acting as AGDSFs to perform a session function, the Bridge-Hub nomination mechanism may create a Hub and Spoke Topology between the respective SPS 20A-D, where one (and only one) SPS 20A-D acting as an AGDSF will be the Bridge-Hub, and the other SPS 20A-D acting as an AGDSF will be Bridge-Spoke(s). In particular and in an embodiment, once a SPS 20A-D acting as an AGDSF becomes a Bridge-Hub, the Bridge Hub nomination process will be suspended. All the other SPS 20A-D acting as an AGDSF that become active afterwards can only become a Bridge-Spoke. The SPS 20A-D acting as an AGDSF Bridge Hub will stay passive and not send SIP INVI IE(s) to establish a Bridge Session with any SPS 20A-D acting as an GDSF that become active subsequently. However, the SPS 20A-D acting as an AGDSF Bridge Hub will accept an INVITE to a Bridge Session from any new Bridge-Spoke (SPS 20A-D acting as an AGDSF Bridge-Spoke).

Accordingly, each SPS 20A-D acting as an AGDSF Bridge-Spoke will have one (and only one) Bridge Session.

In an embodiment, once an a SPS 20A-D acting an AGDSF becomes a Bridge-Spoke, it will not initiate or accept any more Bridge Sessions invites. Thus in an embodiment, there may be one (and only one) SPS 20A-D acting an AGDSF Bridge Hub, and the other SPS 20A-D will acto or function as AGDSF Bridge-Spokes. In operation, when all the Participants (of session device 30A-I) being serviced by a specific SPS 20A-D acting as an AGDSF has departed, the SPS 20A-D AGDSF instance may become Inactive, and will disconnect all its Bridge Session(s). If a SPS 20A-D acting as an AGDSF Bridge-Spoke becomes Inactive, the rest of the nodes (other SPS 20A-D acting as an AGDSF(s)) in the Topology stay the same (same state).

In an embodiment and by definition, a Bridge-Hub cannot become Inactive, before all the Bridge-Spokes have gone Inactive (it will always have at least participant where the participant may represent a Bridge-spoke). In an embodiment, if a SPS 20A-D acting as an AGDSF Bridge-Hub becomes Out-Of-Service, then all the surviving SPS 20A-D acting as an AGDSF Bridge-Spoke(s) will lose their Bridge Sessions and will create a new Hub and Spoke Topology by nominating a new Bridge-Hub based on the procedure described above. As noted due to constraints on SPS 20A-B, an embodiment may employ multiple Tiers of Hub and Spokes to ensure that memory, processor, or bandwidth constraints do not cause the failure of any SPS 20A-D acting a Bridge-Hub or Bridge-Spoke.

As noted, there may be other session functions that are distributed across multiple SPS 20A-D in order to be processed including session transfer functions and session pickup functions as a function of location of session participants with respect to SPS 20A-D at the time of the transfer or pickup request. For example, a user may wish to pick up a call active at a first SPS 20A-D via a device 30A-I coupled to another SPS 20A-D. In an embodiment, the other SPS 20A-D may communicate with the first SPS 20A-D via an SBUS channel to request the call session to be transferred to its control so a local device 30A-I may answer or pickup the session or call on the other SPS 20A-D or node.

In an embodiment, an active session may need to be or may desirably be transferred between SPS 20A-D, each acting as a node. For example, a device 30A-I may initiate a session via a secondary node (SPS 20A-D) and the session (active) may ideally be transferred to its primary node (other SPS 20A-D). In an embodiment, the SPS 20A-D transferring an active session (transferrer) may communicate with the SPS 20A-D to receive the active session (transferee) via an SBUS channel or another channel. The transferrer may place the active session on hold and start a session between itself and the transferee (other SPS 20A-D). Once the transferee accepts the session, then the two sessions (the one on hold and the active session) between sessions may be connected together prior to ending the session on the transferrer. The transferrer may control these functions via a specialized channel.

FIG. 5A illustrates a block diagram of a device 230 that may be employed at least in part in a session processing system 20A-D and session monitoring systems 50 in various embodiments. The device 230 may include a central processing unit (CPU) 232, a random-access memory (RAM) 234, a read only memory (ROM) 237, a local wireless/GPS modem/transceiver 244, a display 247, a camera 257, a speaker 245, a rechargeable electrical storage element 256, and an antenna 246. The CPU 232 may include a sessions module 254. The RAM 234 may include a queue or table 248 where the queue 248 may be used to store session events, objects, and maps. The RANI 234 may also include program, algorithm, and session data and session instructions. The rechargeable electrical storage element may be a battery or capacitor in an embodiment.

The modem/transceiver 244 or CPU 232 may couple, in a well-known manner, the device 230 in architecture 10A-C to enable communication with session devices 30A-I, session processing system 20A-D, or session monitoring system 50. The modem/transceiver 244 may also be able to receive global positioning signals (GPS) and the CPU 232 may be able to convert the GPS signals to location data that may be stored in the RAM 234. The ROM 237 may store program instructions to be executed by the CPU 232 or sessions module 254.

FIG. 5B illustrates a block diagram of a device 260 that may be employed at least in part in a session device 30A-I in various embodiments. The device 260 may include a central processing unit (CPU) 262, a random access memory (RAM) 264, a read only memory (ROM) 266, a display 268, a user input device 272, a transceiver application specific integrated circuit (ASIC) 274, a microphone 288, a speaker 282, storage 276, a non-rechargeable or rechargeable electrical energy storage unit 286, and an antenna 284. The CPU 262 may include a session module 292. The RAM 264 may include queues 278 where the queues 278 may store session data.

The ROM 266 is coupled to the CPU 262 and may store the program instructions to be executed by the CPU 262 and session module 292. The ROM 266 may include applications and instructions for the session module 292. The RAM 264 may be coupled to the CPU 262 and may store temporary program data, overhead information, and the queues 278. The user input device 272 may comprise an input device such as a keypad, touch pad screen, track ball or other similar input device that allows the user to navigate through menus in order to operate the device 260. The display 268 may be an output device such as a CRT, LCD or other similar screen display that enables the user to read, view, or hear multimedia content.

The microphone 288 and speaker 282 may be incorporated into the device 260. The microphone 288 and speaker 282 may also be separated from the device 260. Received data may be transmitted to the CPU 262 via a serial bus 275 where the data may include messages, digital media content, or session information. The transceiver ASIC 274 may include an instruction set necessary to communicate in architectures 10A-C. The transceiver ASIC 274 may be coupled to the antenna 284 to communicate session events and content. When a message is received by the transceiver ASIC 274, its corresponding data may be transferred to the CPU 262 via the serial bus 275. The data can include wireless protocol, overhead information, session data, and content to be processed by the device 260 in accordance with the methods described herein.

The rechargeable electrical storage element 286 may be a battery or capacitor in an embodiment. The storage 276 may be any digital storage medium and may be coupled to the CPU 262 and may store temporary program data, overhead information, session events, and content. Any of the components previously described can be implemented in a number of ways, including embodiments in software. Thus, the devices 230, 260 elements including the RAM 234, ROM 237, CPU 232, modem/transceiver 244, storage 276, CPU 262, RAM 264, ROM 266, and transceiver ASIC 274, may all be characterized as "modules" herein.

The modules may include hardware circuitry, single or multi-processor circuits, memory circuits, software program modules and objects, firmware, and combinations thereof, as desired by the architect of the architecture 10A-C and as appropriate for particular implementations of various embodiments. Devices 30A-I and systems 20A-D and 50 may communicate in architecture 10A-C using one or more known digital communication formats including a cellular protocol such as code division multiple access (CDMA), time division multiple access (TDMA), Global System for Mobile Communications (GSM), cellular digital packet data (CDPD), Worldwide Interoperability for Microwave Access (WiMAX), satellite format (COMSAT) format, and local protocol such as wireless local area network (commonly called "WiFi"), Near Field Communication (NFC), radio frequency identifier (RFID), ZigBee (IEEE 802.15 standard) (and Bluetooth.

As known to one skilled on the art the Bluetooth protocol includes several versions including v1.0, v1.0B, v1.1, v1.2, v2.0+EDR, v2.1+EDR, v3.0+HS, and v4.0. The Bluetooth protocol is an efficient packet-based protocol that may employ frequency-hopping spread spectrum radio communication signals with up to 79 bands, each band 1 MHz in width, the respective 79 bands operating in the frequency range 2402-2480 MHz. Non-EDR (extended data rate) Bluetooth protocols may employ a Gaussian frequency-shift keying (GFSK) modulation. EDR Bluetooth may employ a differential quadrature phase-shift keying (DQPSK) modulation.

The WiFi protocol may conform to an Institute of Electrical and Electronics Engineers (IEEE) 802.11 protocol. The IEEE 802.11 protocols may employ a single-carrier direct-sequence spread spectrum radio technology and a multi-carrier orthogonal frequency-division multiplexing (OFDM) protocol. In an embodiment, Devices 30A-I and systems 20A-D and 50 may communicate in architecture 10A-C via a WiFi protocol.

The cellular formats CDMA, TDMA, GSM, CDPD, and WiMax are well known to one skilled in the art. It is noted that the WiMax protocol may be used for local communication between the one or more Devices 30A-I and systems 20A-D and 50 in architecture 10A-C. The WiMax protocol is part of an evolving family of standards being developed by the Institute of Electrical and Electronic Engineers (IEEE) to define parameters of a point-to-multipoint wireless, packet-switched communications systems. In particular, the 802.16 family of standards (e.g., the IEEE std. 802.16-2004 (published Sep. 18, 2004)) may provide for fixed, portable, and/or mobile broadband wireless access networks. Additional information regarding the IEEE 802.16 standard may be found in IEEE Standard for Local and Metropolitan Area Networks—Part 16: Air Interface for Fixed Broadband Wireless Access Systems (published Oct. 1, 2004). See also IEEE 802.16E-2005, IEEE Standard for Local and Metropolitan Area Networks—Part 16: Air Interface for Fixed and Mobile Broadband Wireless Access Systems—Amendment for Physical and Medium Access Control Layers for Combined Fixed and Mobile Operation in Licensed Bands (published Feb. 28, 2006). Further, the Worldwide Interoperability for Microwave Access (WiMAX) Forum facilitates the deployment of broadband wireless networks based on the IEEE 802.16 standards. For convenience, the terms "802.16" and "WiMAX" may be used interchangeably throughout this disclosure to refer to the IEEE 802.16 suite of air interface standards. The ZigBee protocol may conform to the IEEE 802.15 network and two or more user session devices 30A-I and session processing systems 20A-D may form a mesh network.

The apparatus and systems of various embodiments may be useful in applications other than a sales architecture configuration. They are not intended to serve as a complete description of all the elements and features of apparatus and systems that might make use of the structures described herein.

Applications that may include the novel apparatus and systems of various embodiments include electronic circuitry used in high-speed computers, communication and signal processing circuitry, modems, single or multi-processor modules, single or multiple embedded processors, data switches, and application-specific modules, including multilayer, multi-chip modules. Such apparatus and systems may further be included as sub-components within a variety of electronic systems, such as televisions, cellular telephones, personal computers (e.g., laptop computers, desktop computers, handheld computers, tablet computers, etc.), workstations, radios, video players, audio players (e.g., mp3 players), vehicles, medical devices (e.g., heart monitor, blood pressure monitor, etc.) and others. Some embodiments may include a number of methods.

It may be possible to execute the activities described herein in an order other than the order described. Various activities described with respect to the methods identified herein can be executed in repetitive, serial, or parallel fashion.

A software program may be launched from a computer-readable medium in a computer-based system to execute functions defined in the software program. Various programming languages may be employed to create software programs designed to implement and perform the methods disclosed herein. The programs may be structured in an object-orientated format using an object-oriented language such as Java or C++. Alternatively, the programs may be structured in a procedure-orientated format using a procedural language, such as assembly or C. The software components may communicate using a number of mechanisms well known to those skilled in the art, such as application program interfaces or inter-process communication techniques, including remote procedure calls. The teachings of various embodiments are not limited to any particular programming language or environment.

The accompanying drawings that form a part hereof show, by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In the foregoing Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment.

What is claimed is:

1. A method of implementing geographically distributed summing functions (GDSF) in a distributed communication architecture including a plurality of session processing systems conducting sessions between a plurality of user session capable devices, the method including:
 determining that a session request from one of the plurality of user session capable devices includes a summing function that is distributed across more than one of the plurality of session processing systems; and
 directing one of the plurality of session processing systems which the session request is distributed to function as a summation bridge between the others of the plurality of session processing systems which the session request is distributed to enable the session between the plurality of user session capable devices,
 wherein each of the plurality of session processing systems is capable of functioning as a summation bridge between the others of the plurality of session processing systems.

2. The method of implementing GDSF in a distributed communication architecture of claim 1, wherein the plurality of session processing systems employ Session Initiation Protocol (SIP) protocols to conduct sessions between the plurality of user session capable devices.

3. The method of implementing GDSF in a distributed communication architecture of claim 2, further including directing the others of the plurality of session processing systems which the session request is distributed to perform summing functions and directing the one of the plurality of session processing systems acting as a summation bridge to perform aggregate summing functions for the session request.

4. The method of implementing GDSF in a distributed communication architecture of claim 1, wherein the session request includes conducting a real time media session between the plurality of user session capable devices.

5. The method of implementing GDSF in a distributed communication architecture of claim 4, further including directing the others of the plurality of session processing systems which the session request is distributed to perform summing functions for the session request.

6. The method of implementing GDSF in a distributed communication architecture of claim 4, further including directing the others ene of the plurality of session processing systems which the session request is distributed to perform summing functions.

7. The method of implementing GDSF in a distributed communication architecture of claim 6, further including directing the one of the plurality of session processing systems acting as a summation bridge to perform aggregate summing functions for the session request.

8. The method of implementing GDSF in a distributed communication architecture of claim 4, wherein the plurality of session processing systems employ Session Initiation Protocol (SIP) protocols.

9. The method of implementing GDSF in a distributed communication architecture of claim 4, wherein the method includes employing a session monitoring system in the distributed communication architecture to electronically monitor in real-time session events of a plurality of session capable devices published on monitoring channels and create and maintain maps of session events based on one of the related user session capable device's uniform resource locator (URL), User ID, or domain.

10. The method of implementing GDSF in a distributed communication architecture of claim 9, further including directing the one of the plurality of session processing systems to act as the summation bridge based on the maps of session events.

11. The method of implementing GDSF in a distributed communication architecture of claim 10, further including directing the one of the plurality of session processing systems acting as a summation bridge to perform aggregate summing functions for the session request and directing the others of the more than one of the plurality of session processing systems which the session request is distributed to perform summing functions.

12. The method of implementing GDSF in a distributed communication architecture of claim 1, wherein the session request includes conducting a voice over internet protocol session between the plurality of user session capable devices.

13. The method of implementing GDSF in a distributed communication architecture of claim 12, wherein the method includes directing each session processing system of the plurality of session processing systems to electronically publish in real-time events for one of creating, updating, and deleting a session for a user session capable device of the plurality of user session capable devices.

14. The method of implementing GDSF in a distributed communication architecture of claim 12, wherein the method includes directing each session processing system of the plurality of session processing systems to electronically publish in real-time events for one of creating, updating, and deleting a session for a user session capable device of the plurality of user session capable devices and the published events include the Session ID and session processing system's Hostname.

15. The method of implementing GDSF in a distributed communication architecture of claim 12, wherein the method includes employing a session monitoring system in the distributed communication architecture to electronically monitor in real-time session events of a plurality of user session capable devices published on monitoring channels based on one of the related session capable device's uniform resource locator (URL), User ID, or domain.

16. The method of implementing GDSF in a distributed communication architecture of claim 12, wherein the method includes employing a session monitoring system in the distributed communication architecture to electronically monitor in real-time session events of a plurality of user session capable devices published on monitoring channels and create and maintain maps of session events based on one of the related user session capable device's uniform resource locator (URL), User ID, or domain.

17. The method of implementing GDSF in a distributed communication architecture of claim 16, further including directing the one of the plurality of session processing systems to act as the summation bridge based on the maps of session events.

18. The method of implementing GDSF in a distributed communication architecture of claim 12, wherein the plurality of session processing systems employ Session Initiation Protocol (SIP) protocols.

19. The method of implementing GDSF in a distributed communication architecture of claim 12, further including directing the others of the plurality of session processing systems which the session request is distributed to perform summing functions.

20. The method of implementing GDSF in a distributed communication architecture of claim 19, further including directing the one of the plurality of session processing systems acting as a summation bridge to perform aggregate summing functions for the session request.

* * * * *